US011808610B2

(12) United States Patent
Okada et al.

(10) Patent No.: US 11,808,610 B2
(45) Date of Patent: Nov. 7, 2023

(54) POSITION DETECTION APPARATUS, POSITION DETECTION SYSTEM, AND POSITION DETECTION METHOD

(71) Applicant: Asahi Kasei Microdevices Corporation, Tokyo (JP)

(72) Inventors: Keita Okada, Tokyo (JP); Takahito Hara, Tokyo (JP)

(73) Assignee: Asahi Kasei Microdevices Corporation, Tokyo (JP)

( * ) Notice: Subject to any disclaimer, the term of this patent is extended or adjusted under 35 U.S.C. 154(b) by 0 days.

(21) Appl. No.: 17/591,604

(22) Filed: Feb. 3, 2022

(65) Prior Publication Data
US 2022/0252425 A1   Aug. 11, 2022

(30) Foreign Application Priority Data

Feb. 9, 2021 (JP) .................................. 2021-019039
Dec. 10, 2021 (JP) .................................. 2021-201197

(51) Int. Cl.
*G01D 5/14* (2006.01)

(52) U.S. Cl.
CPC ..................................... *G01D 5/14* (2013.01)

(58) Field of Classification Search
CPC ....................................................... G01D 5/14
See application file for complete search history.

(56) References Cited

U.S. PATENT DOCUMENTS

| 7,315,164 B2 * | 1/2008 | Hata ......................... G03B 3/10 324/207.2 |
| 8,682,154 B2 * | 3/2014 | Ishikawa ................ G01D 5/145 396/89 |
| 9,297,634 B2 * | 3/2016 | Bartos .................... G01D 5/145 |
| 2007/0145970 A1 | 6/2007 | Takahashi |
| 2009/0185285 A1 | 7/2009 | Abe |
| 2009/0224750 A1 | 9/2009 | Hosek |
| 2013/0034346 A1 | 2/2013 | Ishikawa |
| 2014/0156220 A1 | 6/2014 | Okamoto |
| 2014/0306693 A1 | 10/2014 | Wolf |

(Continued)

FOREIGN PATENT DOCUMENTS

| CN | 104390579 A | 3/2015 |
| JP | H05217722 A | 8/1993 |

(Continued)

*Primary Examiner* — Walter L Lindsay, Jr.
*Assistant Examiner* — Milton Gonzalez

(57) ABSTRACT

The position detection apparatus is provided comprising: an acquisition section that acquires a magnetic field pattern from a detection target apparatus comprising a detection unit having a plurality of magnetic sensor sections and a moving unit configured to provide the magnetic field pattern corresponding to the position with respect to the detection unit to the plurality of magnetic sensor sections; a reference pattern output section that outputs reference patterns respectively corresponding to each of a plurality of candidate positions of the moving unit with respect to the detection unit; and a detection section that detects which of the plurality of candidate positions is a position of the moving unit with respect to the detection unit based on a result of comparison of the acquired magnetic field pattern and the reference pattern corresponding to each of the plurality of candidate positions.

18 Claims, 9 Drawing Sheets

(56) References Cited

U.S. PATENT DOCUMENTS

| | | |
|---|---|---|
| 2015/0163388 A1 | 6/2015 | Miyashita |
| 2015/0292919 A1 | 10/2015 | Ogasawara |
| 2018/0216965 A1 | 8/2018 | Richard |
| 2018/0372510 A1 | 12/2018 | Mattheis |
| 2020/0355812 A1 | 11/2020 | Nguyen |
| 2020/0370877 A1 | 11/2020 | Bidaux |

FOREIGN PATENT DOCUMENTS

| | | |
|---|---|---|
| JP | H07103992 A | 4/1995 |
| JP | 4383237 B2 | 12/2009 |
| JP | 2011022040 A | 2/2011 |
| JP | 2018004315 A | 1/2018 |
| KR | 101507062 B1 | 4/2015 |
| KR | 101605439 B1 | 3/2016 |
| KR | 20160034138 A | 3/2016 |
| KR | 101933011 B1 | 12/2018 |
| KR | 20190018284 A | 2/2019 |

\* cited by examiner

| INDEX | x[mm] | $S_1$[mT] | $S_2$[mT] | $\cdots$ | $S_k$[mT] | $\cdots$ | $S_N$[mT] |
|---|---|---|---|---|---|---|---|
| 1 | x(1) | $S(1)_1$ | $S(1)_2$ | | $S(1)_k$ | | $S(1)_N$ |
| 2 | x(2) | $S(2)_1$ | $S(2)_2$ | | $S(2)_k$ | | $S(2)_N$ |
| $\vdots$ | | | | | | | |
| i | x(i) | $S(i)_1$ | $S(i)_2$ | | $S(i)_k$ | | $S(i)_N$ |
| $\vdots$ | | | | | | | |
| I | x(I) | $S(I)_1$ | $S(I)_2$ | | $S(I)_k$ | | $S(I)_N$ |

*FIG.5*

POSITION DETECTION APPARATUS, POSITION DETECTION SYSTEM, AND POSITION DETECTION METHOD

The contents of the following Japanese patent application (s) are incorporated herein by reference:
NO. 2021-019039 filed in JP on Feb. 9, 2021.
NO. 2021-201197 filed in JP on Dec. 10, 2021.

BACKGROUND

1. Technical Field

The present invention relates to a position detection apparatus, a position detection system, and a position detection method.

2. Related Art

Conventionally, relative position detection is used to detect a position of a target that moves within a predetermined movable range, such as a movement of a lens in an imaging apparatus, for example. An apparatus using relative position detection first moves a target to a reference position, and detects an amount of movement from the reference position to detect the position of the target. Therefore, the apparatus using the relative position detection is not actually available for such as imaging, after activation or the like, before once moving the target such as a lens or the like to the reference position, and thus it takes time from activation to being made actually available.

In contrast, Patent Document 1 and Patent Document 2 disclose apparatuses to perform absolute position detection. Patent Document 1 describes that "the position detection magnet 101 is so disposed as to be inclined at a predetermined angle $\theta$ to the line parallel to the optical axis L (the movement direction of the lens holder 102) along the movement direction of the lens holder 102" (Paragraph 0012) so that "the peak values of the detection signals A sin $\theta$ and A cos $\theta$ output from the position detecting element 100 change in such a manner as to decrease or increase depending on the movement of the optical lens 103 along the direction of the optical axis L" (Paragraph 0016), thereby calculating the position of the position detection magnet 101 in the direction of the optical axis from the peak values of the detection signals.

Patent Document 2 describes that "the position detection unit has a potentiometer 20 serving as first sensor, a position detection magnet 22 serving as second sensor, and an MR element 24 (magnetic resistance element) disposed in opposition thereto," (Paragraph 0026) and "in the position detection unit of the present embodiment, it is possible to identify the cycle in which the sinusoidal signal to be detected is positioned, based on the output signal from the potentiometer 20 and the voltage values (P0, P1, . . . PN) pre-stored in the memory 26. Therefore, after initial adjustment prior to shipment from the factory, the absolute position of the zoom adjustment lens 16 can be directly detected with high precision without moving the zoom adjustment lens 16 to the wide end or the telephoto end at startup" (Paragraph 0047).

PRIOR ART DOCUMENT

Patent Document

Patent Document 1: Japanese Patent Application Publication No. 2009-169202

Patent Document 2: Japanese Patent Application Publication No. 2013-36795

For the apparatuses described in Patent Documents 1 and 2, the structures are complicated by disposing the position detection magnet 101 to be inclined at the angle $\theta$ to the movement direction, providing the potentiometer in addition to the magnetic sensor, and the like.

SUMMARY

A first aspect of the present invention provides a position detection apparatus. The position detection apparatus may comprise a detection unit having a plurality of magnetic sensor sections arranged at different positions from each other in a predetermined direction. The position detection apparatus may comprise an acquisition section that acquires, from a detection target apparatus comprising a moving unit that is movable in a predetermined direction relative to the detection unit and that provides a magnetic field pattern corresponding to the position with respect to the detection unit to the plurality of magnetic sensor sections, the magnetic field pattern measured by the plurality of magnetic sensor sections. The position detection apparatus may comprise a reference pattern output section that outputs reference patterns respectively corresponding to each of a plurality of candidate positions of the moving unit with respect to the detection unit. The position detection apparatus may comprise a detection section that detects which of the plurality of candidate positions is a position of the moving unit with respect to the detection unit based on a result of comparison of the acquired magnetic field pattern and the reference pattern corresponding to each of the plurality of candidate positions.

The plurality of magnetic sensor sections may each have two or more magnetic sensors. The plurality of magnetic sensor sections may each have a calculation section that calculates, based on an output value from each of the two or more magnetic sensors, a detected value in the magnetic field pattern corresponding to that magnetic sensor section.

The calculation section may calculate, as the detected value, a difference between the output values from the magnetic sensors included in the two or more magnetic sensors.

A distance between the two or more magnetic sensors in each of the plurality of magnetic sensor sections may be smaller than a distance between adjacent magnetic sensor sections among the plurality of magnetic sensor sections.

The detection section may determine the candidate position associated to the reference pattern closest to the magnetic field pattern among the reference patterns respectively corresponding to each of the plurality of candidate positions, to be the position of the moving unit with respect to the detection unit.

The detection section may determine the candidate position associated to the reference pattern, having a difference with the magnetic field pattern equal to or smaller than a predetermined reference difference, among the reference patterns respectively corresponding to each of the plurality of candidate positions, to be the position of the moving unit with respect to the detection unit.

The position detection apparatus may comprise a range specifying section that specifies, based on the magnetic field pattern measured by the plurality of magnetic sensor sections, a detection target range for the position of the moving unit with respect to the detection unit as a part of a movable range. The detection section may detect, based on a result of comparison of the magnetic field pattern and the reference pattern corresponding to the position within the detection target range, which position the position of the moving unit with respect to the detection unit is within the detection target range.

The range specifying section may specify the detection target range based on magnitude relationship of the respective detected values contained in the magnetic field pattern.

The detection section may determine, according to the position of the moving unit with respect to the detection unit being detected to be the position associated to the reference pattern, a final position of the moving unit with respect to the detection unit using the detected value of the magnetic sensor section associated to that position.

The detection section may be switchable to output the position associated to the reference pattern or to output the final position as the position of the moving unit with respect to the detection unit.

The detection section may detect, after detecting that the position of the moving unit with respect to the detection unit is the target position, whether the moving unit has moved away from the target position based on the result of comparison of the reference pattern associated to the target position and the magnetic field pattern.

The position detection apparatus may comprise a reference data storing section that stores reference data containing a plurality of sets of the positions of the moving unit with respect to the detection unit and the reference patterns corresponding to those positions.

The reference pattern output section may smooth a predetermined number of reference patterns whose corresponding positions are adjacent to each other in the reference data to output them as the reference patterns used to detect the position of the moving unit with respect to the detection unit.

In preparing processing of the reference data, the acquisition section may acquire the magnetic field pattern at each position of the moving unit with respect to the detection unit as the reference pattern. The acquisition section may smooth the predetermined number of adjacent reference patterns to store them in the reference data storing section for each position.

One of the detection unit and the moving unit may be secured to a lens. The other of the detection unit and the moving unit may be secured to a housing. The detection section may detect a position of the lens with respect to the housing.

According to a second aspect of the present invention, a position detection apparatus is provided. The position detection apparatus may comprise an acquisition section that acquires, from a detection target apparatus comprising a detection unit having a plurality of magnetic sensor sections arranged at different positions from each other in a predetermined direction and a moving unit that is movable in a predetermined direction relative to the detection unit and that provides a magnetic field pattern corresponding to the position with respect to the detection unit to the plurality of magnetic sensor sections, the magnetic field pattern measured by the plurality of magnetic sensor sections. The position detection apparatus may comprise a detection section that detects, based on a result of comparison of the acquired magnetic field pattern and a reference pattern, whether the position of the moving unit with respect to the detection unit is a position associated to the reference pattern. The plurality of magnetic sensor sections may each have two or more magnetic sensors. The plurality of magnetic sensor sections may each have a calculation section that calculates, based on an output value from each of the two or more magnetic sensors, a detected value in the magnetic field pattern corresponding to that magnetic sensor section. A distance between the two or more magnetic sensors in each of the plurality of magnetic sensor sections may be smaller than a distance between adjacent magnetic sensor sections among the plurality of magnetic sensor sections.

According to a third aspect of the present invention, a position detection system is provided. The position detection system may comprise a detection target apparatus and a position detection apparatus.

According to a fourth aspect of the present invention, a position detection method is provided. In the position detection method, it may acquire, from a detection target apparatus comprising a detection unit having a plurality of magnetic sensor sections arranged at different positions from each other in a predetermined direction and a moving unit that is movable in a predetermined direction relative to the detection unit and that provides a magnetic field pattern corresponding to the position with respect to the detection unit to the plurality of magnetic sensor sections, the magnetic field pattern measured by the plurality of magnetic sensor sections. In the position detection method, it may output reference patterns respectively corresponding to each of a plurality of candidate positions of the moving unit with respect to the detection unit. In the position detection method, it may detect which of the plurality of candidate positions is a position of the moving unit with respect to the detection unit based on a result of comparison of the acquired magnetic field pattern and the reference pattern corresponding to each of the plurality of candidate positions.

According to a fifth aspect of the present invention, a position detection method is provided. In the position detection method, it may acquire, from a detection target apparatus comprising: a detection unit having a plurality of magnetic sensor sections arranged at different positions from each other in a predetermined direction, wherein each of the plurality of magnetic sensor sections has two or more magnetic sensors and a calculation section that calculates, based on an output value from each of the two or more magnetic sensors, a detected value corresponding to that magnetic sensor section, and wherein a distance between the two or more magnetic sensors in each of the plurality of magnetic sensor sections is smaller than a distance between adjacent magnetic sensor sections among the plurality of magnetic sensor sections; and a moving unit that is movable in a predetermined direction relative to the detection unit and that provides a magnetic field pattern corresponding to the position with respect to the detection unit to the plurality of magnetic sensor sections, the magnetic field pattern measured by the plurality of magnetic sensor sections. In the position detection method, it may detect, based on a result of comparison of the acquired magnetic field pattern and a reference pattern, whether the position of the moving unit with respect to the detection unit is a position associated to the reference pattern.

According to a sixth aspect of the present invention, there is provided a computer-readable medium having a position detection program recorded thereon to be executed by a computer. The position detection program may cause the computer to function as an acquisition section that acquires, from a detection target apparatus comprising a detection unit having a plurality of magnetic sensor sections arranged at different positions from each other in a predetermined direction a moving unit that is movable in a predetermined direction relative to the detection unit and that provides a magnetic field pattern corresponding to the position with respect to the detection unit to the plurality of magnetic sensor sections, the magnetic field pattern measured by the plurality of magnetic sensor sections. The position detection program may cause the computer to function as a reference pattern output section that outputs reference patterns respectively corresponding to each of a plurality of candidate positions of the moving unit with respect to the detection unit. The position detection program may cause the computer to function as a detection section that detects which of the plurality of candidate positions is a position of the moving unit with respect to the detection unit based on a result of comparison of the acquired magnetic field pattern and the reference pattern corresponding to each of the plurality of candidate positions.

According to a seventh aspect of the present invention, there is provided a computer-readable medium having a position detection program recorded thereon to be executed by a computer. The position detection program may cause the computer to function as an acquisition section that acquires, from a detection target apparatus comprising: a detection unit having a plurality of magnetic sensor sections arranged at different positions from each other in a predetermined direction, wherein each of the plurality of magnetic sensor sections has two or more magnetic sensors and a calculation section that calculates, based on an output value from each of the two or more magnetic sensors, a detected value corresponding to that magnetic sensor section, and wherein a distance between the two or more magnetic sensors in each of the plurality of magnetic sensor sections is smaller than a distance between adjacent magnetic sensor sections among the plurality of magnetic sensor sections; and a moving unit that is movable in a predetermined direction relative to the detection unit and that provides a magnetic field pattern corresponding to the position with respect to the detection unit to the plurality of magnetic sensor sections, the magnetic field pattern measured by the plurality of magnetic sensor sections. The position detection program may cause the computer to function as a detection section that detects, based on a result of comparison of the acquired magnetic field pattern and a reference pattern, whether the position of the moving unit with respect to the detection unit is a position associated to the reference pattern.

Note that the summary clause above does not recite all necessary features of the present invention. Moreover, a sub-combination of a group of these features may also constitute the present invention.

BRIEF DESCRIPTION OF THE DRAWINGS

FIG. 5 illustrates exemplary reference data stored in a reference data storing section 130 according to the present embodiment.

DESCRIPTION OF EXEMPLARY EMBODIMENTS

While the present invention will be described below by means of embodiments of the invention, these embodiments below are not intended to limit the invention defined by the claims. In addition, all combinations of features set forth in the embodiments are not necessarily essential to the solutions of the present invention.

Figure 1:
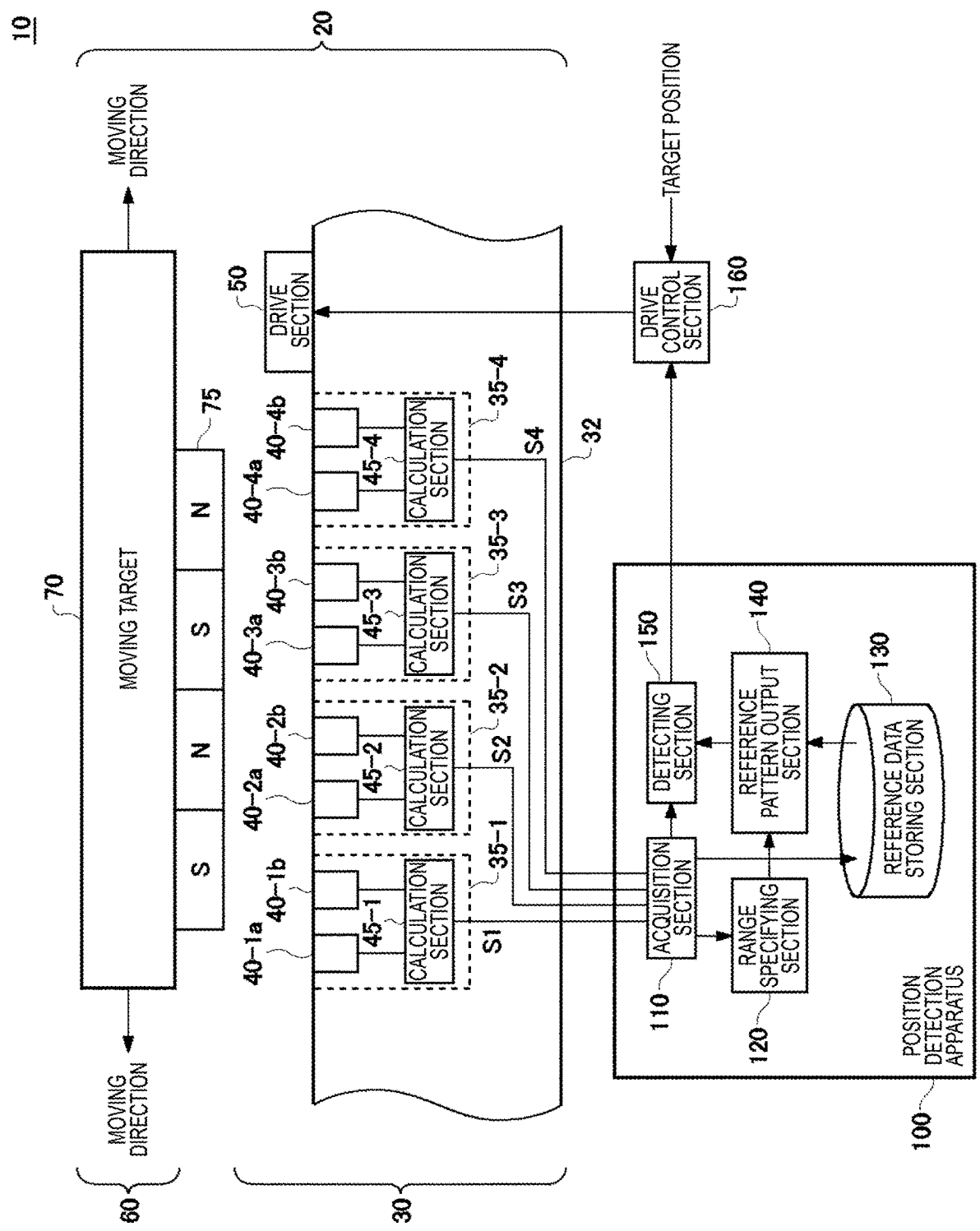
FIG. 1 illustrates a configuration of a system 10 according to the present embodiment.

FIG. 1 illustrates a configuration of a system 10 according to the present embodiment. The system 10 can use a relatively simple structure using a plurality of magnetic sensor section 35-1 through 35-4 to detect a position of a moving unit 60, which has a relatively large movable range, with respect to a detection unit 30 by means of absolute position detection.

The system 10 comprises a detection target apparatus 20, a position detection apparatus 100, and a drive control section 160. The detection target apparatus 20 has the detection unit 30 and the moving unit 60 movable in a predetermined direction relative to the detection unit 30, and is an apparatus wherein the position of the moving unit 60 with respect to the detection unit 30 is a detection target of absolute position detection by the position detection apparatus 100. For example, the detection target apparatus 20 may be a lens apparatus of an imaging apparatus, wherein one of the detection unit 30 and the moving unit 60 (e.g., the moving unit 60) may be secured to a lens (not shown) while the other of the detection unit 30 and the moving unit 60 (e.g., the detection unit 30) may be secured to a housing of the lens apparatus. Alternatively, the detection target apparatus 20 may be any other apparatus which moves the moving unit 60 with respect to the detection unit 30 within the movable range.

The detection unit 30 has a housing 32, a plurality of magnetic sensor sections 35-1 through 35-4 (also referred to as a "magnetic sensor section 35"), and a drive section 50. The housing 32 may be such as a housing of the lens apparatus, for example. The plurality of magnetic sensor sections 35 are arranged at different positions from each other in a predetermined direction. Here, the "predetermined direction" may be a moving direction of the moving unit 60 with respect to the detection unit 30, and is also referred to as the "moving direction". In the present embodiment, the detection unit 30 has four magnetic sensor sections 35 as an example. Alternatively, the detection unit 30 may have two, three, five or more magnetic sensor sections 35.

Note that the plurality of magnetic sensor sections 35, as long as they are arranged at different positions from each other in the moving direction, may be arranged along the moving direction or may be arranged offset from each other in a direction perpendicular to the moving direction. The present embodiment illustrates the case where the plurality of magnetic sensor sections 35 are arranged along the moving direction.

Each of the plurality of magnetic sensor sections 35 includes two or more magnetic sensors 40 and a calculation section 45. In the present embodiment, the magnetic sensor section 35-1 includes two the magnetic sensors 40-1a and 40-1b and the calculation section 45-1, the magnetic sensor section 35-2 includes two magnetic sensors 40-2a and 40-2b and the calculation section 45-2, the magnetic sensor section 35-3 includes two magnetic sensors 40-3a and 40-3b and the calculation section 45-3, and the magnetic sensor section 35-4 includes two magnetic sensors 40-4a and 40-4b and the calculation section 45-4. Here, the magnetic sensors 40-1a and 40-1b, the magnetic sensors 40-2a and 40-2b, the magnetic sensors 40-3a and 40-3b, and the magnetic sensors 40-4a and 40-4b are also each referred to as the "magnetic sensor 40". Moreover, the calculation sections 45-1 through 45-4 are also each referred to as the "calculation section 45".

Each magnetic sensor 40 measures a magnetic field at the position at which each magnetic sensor 40 is provided and outputs an output value (e.g., voltage or current) according to the magnetic field. The magnetic sensor 40 may be one which measures a strength of the magnetic field in the vertical direction in the drawing (i.e., the direction of the moving unit 60 with respect to the detection unit 30) or may be one which measures a strength of the magnetic field in the other direction as long as it can detect a change in the magnetic field depending on the movement of the moving unit 60.

Each calculation section 45 is connected to the two or more magnetic sensors 40 included in the magnetic sensor section 35 in which each calculation section 45 is provided. Each calculation section 45 calculates a detected value corresponding to the magnetic sensor section 35 in the magnetic field pattern based on each output value from these two or more magnetic sensors 40. For example, each calculation section 45 may calculate a sum or average of the output values from these two or more magnetic sensors 40 as the detected value, or may calculate a difference between the output values from two magnetic sensors 40 among these two or more magnetic sensors 40 as the detected value.

The two or more magnetic sensors 40 in each of the plurality of magnetic sensor sections 35 may be provided adjacent to each other. In this case, a distance between the two or more magnetic sensors 40 in each of the plurality of magnetic sensor sections 35 is smaller than a distance between adjacent magnetic sensor sections 35 among the plurality of magnetic sensor sections 35. That is, the distance between adjacent magnetic sensors 40 in the same magnetic sensor section 35 (e.g., the distance between the magnetic sensor 40-1a and the magnetic sensor 40-1b) is smaller than the distance between neighboring magnetic sensors 40 of the adjacent magnetic sensor sections 35 (e.g., the distance between the magnetic sensor 40-1b and the magnetic sensor 40-2a). Whereby, each magnetic sensor section 35 can output an appropriate detected value using a local magnetic field at the position at which each magnetic sensor section 35 is provided, and can use the plurality of magnetic sensor sections 35 distributedly arranged over a wide range of the moving direction of the moving unit 60 to allow detecting the position of the moving unit 60 having a wide movable range.

Here, although the two or more magnetic sensors 40 of each magnetic sensor section 35 may be arranged at different positions from each other in the moving direction of the moving unit 60, they may be arranged at the same position in the moving direction of the moving unit 60. For example, the two or more magnetic sensors 40 may be arranged at different positions with each other in a direction perpendicular to each of the moving direction of the moving unit 60 (the horizontal direction in the drawing) and the direction of the moving unit 60 with respect to the detection unit 30 (the vertical direction in the drawing) (i.e., the direction perpendicular to the paper plane of the drawing).

The drive section 50 is secured to the housing 32. The drive section 50 is an actuator such as an electrostatic actuator, a VCM (voice coil motor), or a piezo actuator. The drive section 50 is connected to the drive control section 160 to be controlled by the drive control section 160 to move a moving target 70 in the moving direction. The drive section 50 may have a driving coil secured to the housing 32 and move the moving target 70 in the moving direction by generating a magnetic force between the driving coil and magnet 75. Such a driving coil may be in a structure having windings around the outer periphery of each magnetic sensor section 35-1.

The moving unit 60 has the moving target 70 and the magnet 75. The moving target 70 is a part serving as a target to be moved by the drive section 50, such as a lens in the lens apparatus, for example. The magnet 75 is secured to the moving target 70 and provide a magnetic field pattern corresponding to its position with respect to the detection unit 30 to the plurality of magnetic sensor sections 35. In the present embodiment, the magnet 75 provides a structure in which S pole and N pole are alternately arranged in the moving direction of the moving unit 60. Alternatively, the magnet 75 may have any structure (e.g., an arrangement of S poles and N poles) which can provide the magnetic field pattern corresponding to the movement of the moving unit 60 to the plurality of magnetic sensor section 35.

Note that, instead of having the magnet 75, the moving unit 60 may have any means for changing the magnetic field that can change the magnetic field pattern to be provided to the plurality of magnetic sensor sections 35 depending on the movement of the moving unit 60. For example, the moving unit 60 may have a magnetic flux concentrating plate or the like made of soft magnetic material, and may change the magnetic field generated by the magnet secured to the housing 32 depending on the position of the moving unit 60.

The position detection apparatus 100 has an acquisition section 110, a range specifying section 120, a reference data storing section 130, a reference pattern output section 140, and a detection section 150. The acquisition section 110 is connected to the plurality of magnetic sensor sections 35 to acquire the magnetic field pattern measured by the plurality of magnetic sensor sections 35.

Here, the "magnetic field pattern" refers to a pattern of combination of a plurality of detected values, which is a magnetic field provided to the detection unit 30 according to the position of the moving unit 60 measured by the plurality of magnetic sensors 40 and converted to the detected values for each of the magnetic sensor sections 35, output by the plurality of magnetic sensor sections 35. In the example of this drawing, the magnetic sensor sections 35-1 through 35-4 output detected values S1 through S4, so that the magnetic field pattern is a set of the detected value S1 through S4 (S1, S2, S3, S4). Note that, since a set of the detected values S1 through S4 would be a different set of values depending on a distribution of the magnetic field provided to the detection unit 30, it is an identifiably collected distribution of the magnetic field provided to the detection unit 30 and may also be represented as a "magnetic field profile".

The range specifying section 120 is connected to the acquisition section 110. The range specifying section 120 specifies a detection target range for the position of the moving unit 60 with respect to the detection unit 30 as a part of the movable range based on the magnetic field pattern measured by the plurality of magnetic sensor sections 35. For example, when the movable range of the moving unit 60 is 12 mm, the range specifying section 120 narrows the range in which the moving unit 60 is located using the magnetic field pattern down to such as a "range from 3 mm to 6 mm," for example.

The reference data storing section 130 stores reference data used to produce the reference pattern that represents the magnetic field pattern to be measured by the plurality of magnetic sensor sections 35 for each position of the moving unit 60. The reference pattern output section 140 is connected to the range specifying section 120 and the reference data storing section 130. The reference pattern output section 140 uses the reference data stored in the reference data storing section 130 to output the reference pattern corresponding to each of one or more candidate positions of the moving unit 60 with respect to the detection unit 30. Here, the reference pattern output section 140 outputs the reference pattern corresponding to each of the one or more candidate positions within the detection target range specified by the range specifying section 120.

The detection section 150 is connected to the acquisition section 110 and the reference pattern output section 140, and detects the position of the moving unit 60 with respect to the detection unit 30 based on the magnetic field pattern acquired by the acquisition section 110. The detection section 150 detects, for each of one or more reference patterns corresponding to the one or more candidate positions output from the reference pattern output section 140, whether the position of the moving unit 60 with respect to the detection unit 30 is the position associated to the reference pattern based on a result of comparison of the magnetic field pattern and the reference pattern. Here, when the reference pattern output section 140 outputs the reference pattern corresponding to the candidate position within the detection target range, the detection section 150 detects which position the position of the moving unit 60 with respect to the detection unit 30 is within the detection target range based on a result of comparison of the magnetic field pattern and the reference pattern corresponding to the position within the detection target range.

The drive control section 160 is connected to the detection section 150 in the position detection apparatus 100 and receives the position of the moving unit 60 with respect to the detection unit 30 from the detection section 150. The drive control section 160 performs drive control of the drive section 50 so as to receive the target position of the moving unit 60 from a control section that controls the system 10, such as a microcontroller of the imaging apparatus, for example, and move the moving unit 60 to the target position.

Figure 2:
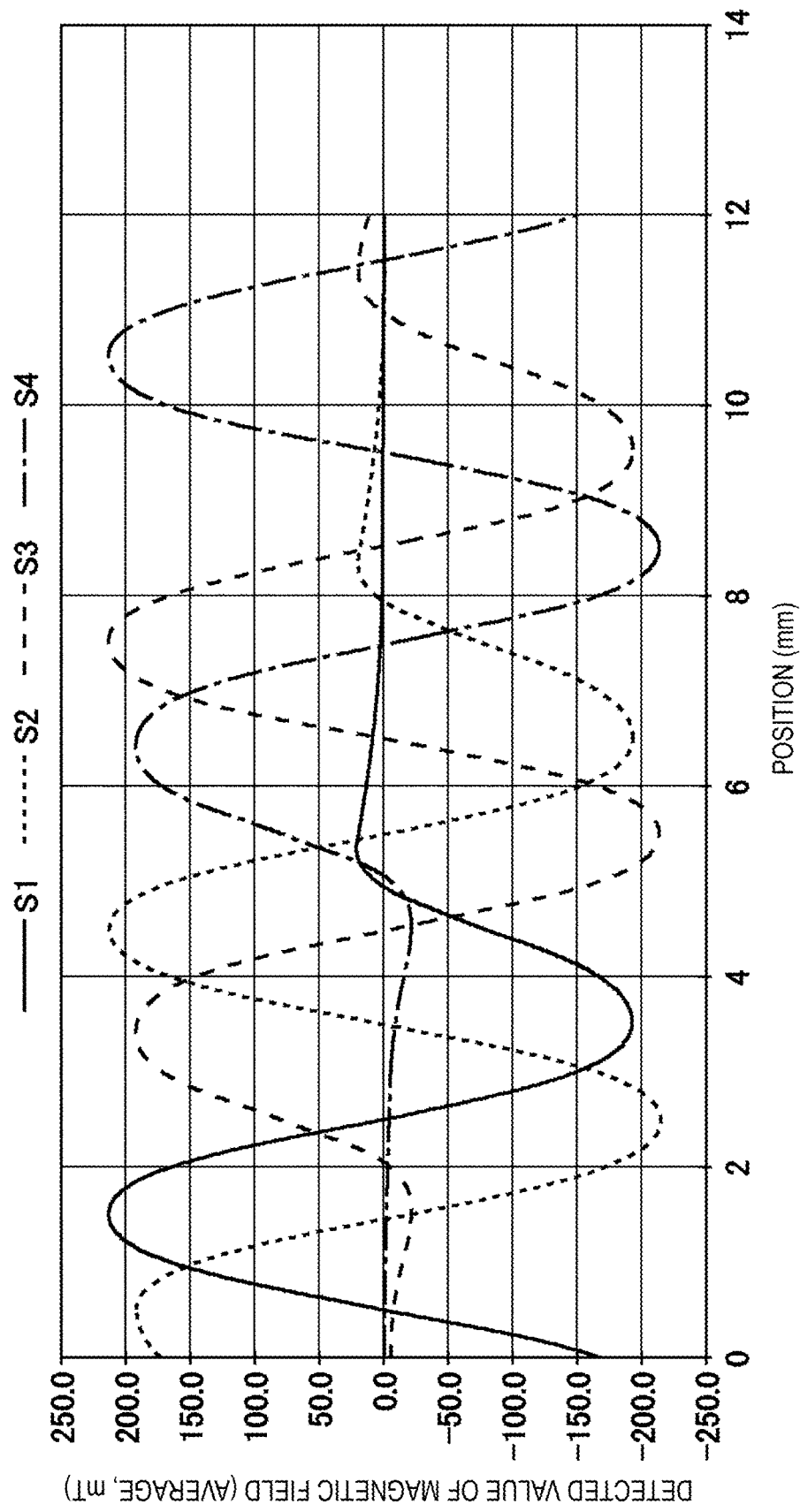
FIG. 2 illustrates an exemplary relationship between a position of a moving unit 60 with respect to a detection unit 30 and a detected value of magnetic fields (average value) from a plurality of calculation sections 45-1 through 45-4.

FIG. 2 illustrates an exemplary relationship between the position of the moving unit 60 with respect to the detection unit 30 and the detected value of the magnetic fields (average value) from the plurality of calculation sections 45-1 through 45-4. For the detection target apparatus 20 in this drawing, the movable range of the moving unit 60 with respect to the detection unit 30 is 0 to 12 mm. The detection target apparatus 20 has the magnet 75 in which a length in the moving direction is 8 mm and the polarities of S pole and N pole alternate in every 2 mm, as shown in FIG. 1. Four magnetic sensor sections 35 are provided at a 3 mm interval in the moving direction, and two magnetic sensors 40 in each magnetic sensor section 35 are provided at a 480 μm interval. In the example of this drawing, each magnetic sensor section 35 outputs an average value of the output values from two connected magnetic sensors 40 as the detected value. This drawing is a graph, for the detection target apparatus 20 configured in this manner, in which an abscissa denotes the positions of the moving unit 60 and an ordinate denotes the detected values S1 through S4 output from each magnetic sensor section 35 at each position. Note that, in this drawing, the detected values S1 through S4 at each position of the moving unit 60 are values obtained from a simulation.

As shown in this drawing, the magnetic field patterns represented by sets of the detected value S1 through S4 are different for each position of the moving unit 60. Accordingly, the detection section 150 can detect the position of the moving unit 60 by determining which set of the detected values S1 through S4 for each position as shown in this drawing the magnetic field pattern acquired by the acquisition section 110 corresponds to. In the present embodiment, the reference pattern output section 140 generates sets of the detected values S1 through S4 for each position as shown in this drawing as the reference patterns, the detection section 150 determines which of the reference patterns generated by the reference pattern output section 140 matches the magnetic field pattern acquired by the acquisition section 110, and specifies the position associated to the matched reference pattern as the position of the moving unit 60. Alternatively, when a transfer function is required that calculates the position from a set of the detected values S1 through S4, the detection section 150 may calculate the position of the moving unit 60 by entering the detected value S1 through S4 contained in the magnetic field pattern into the transfer function.

Figure 3:
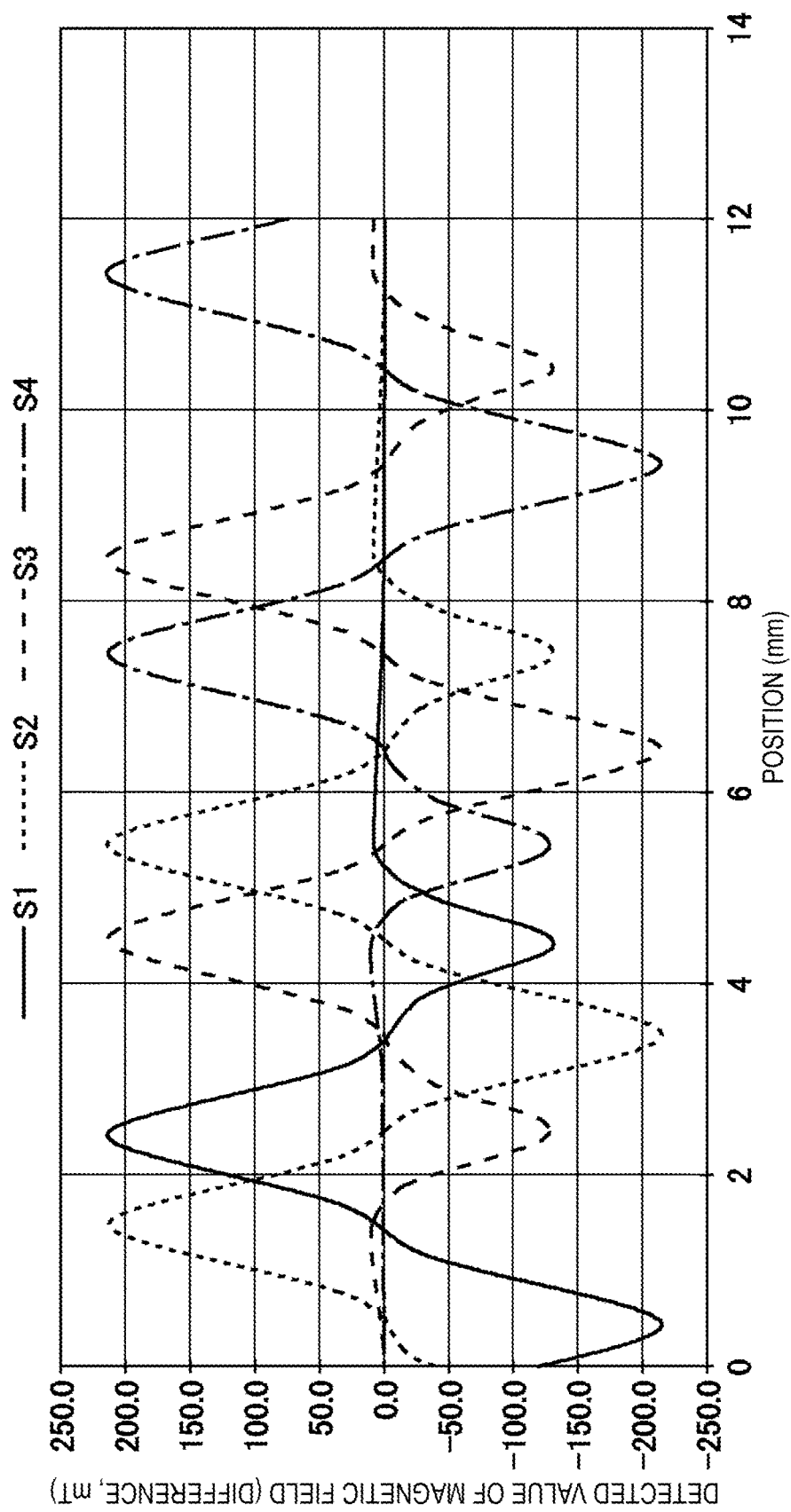
FIG. 3 illustrates an exemplary relationship between a position of the moving unit 60 with respect to the detection unit 30 and a detected value of magnetic fields (difference value) from the plurality of calculation sections 45-1 through 45-4.

FIG. 3 illustrates an exemplary relationship between the position of the moving unit 60 with respect to the detection unit 30 and the detected value of magnetic fields (difference value) from the plurality of calculation sections 45-1 through 45-4. For the detection target apparatus 20 in this drawing, while the structure of the magnet 75 and the arrangement of the magnetic sensor sections 35 are the same as those in FIG. 2, it is different in that each magnetic sensor section 35 outputs a difference value between the output values from two connected magnetic sensors 40 as the detected value.

As shown in this drawing, the magnetic field patterns represented by sets of the detected value S1 through S4 are different for each position of the moving unit 60. Accordingly, also in the example of this drawing, the detection section 150 can detect the position of the moving unit 60 by determining which set of the detected values S1 through S4 for each position as shown in this drawing the magnetic field pattern acquired by the acquisition section 110 corresponds to.

Here, when magnetism sensing directions of two magnetic sensors 40 in each magnetic sensor section 35 are the same, the average value of the output values from two magnetic sensors 40 are affected by a disturbance magnetic field, whereas the difference value of the output values from two magnetic sensors 40 is a value in which a component of the disturbance magnetic field contained in each output value is compensated for. Accordingly, when using such a magnetic sensor section 35, the calculation section 45 can output the detected value more suitable for position detection by outputting the difference value of the output values from two magnetic sensors 40 as the detected value. Note that, when the magnetism sensing directions of two magnetic sensors 40 in each magnetic sensor section 35 are opposite, the calculation section 45 can output the detected value in which a component of the disturbance magnetic field is compensated for by outputting a sum value or average value of the output values from two magnetic sensors 40 as the detected value.

Note that, by arranging distributedly the plurality of magnetic sensor sections 35 at different positions in the moving direction of the moving unit 60 so that they can cover the movable range of the moving unit 60, different magnetic fields are provided to the plurality of magnetic sensors 40 depending on the position of the moving unit 60. Accordingly, the plurality of magnetic sensors 40 comprised in the plurality of magnetic sensor sections 35 may be provided respectively at any position in the moving direction of the moving unit 60 as long as they are arranged distributedly within the movable range of the moving unit 60. Moreover, each magnetic sensor section 35 may have only one magnetic sensor 40 or may have three or more of them, or the magnetic sensor sections 35 may each have a different number of magnetic sensors 40. Moreover, each calculation section 45 can supply a different magnetic field pattern to the position detection apparatus 100 depending on the position of the moving unit 60 by calculating the detected value by means of computing that reflects the output value from each magnetic sensor 40 connected thereto.

Figure 4:
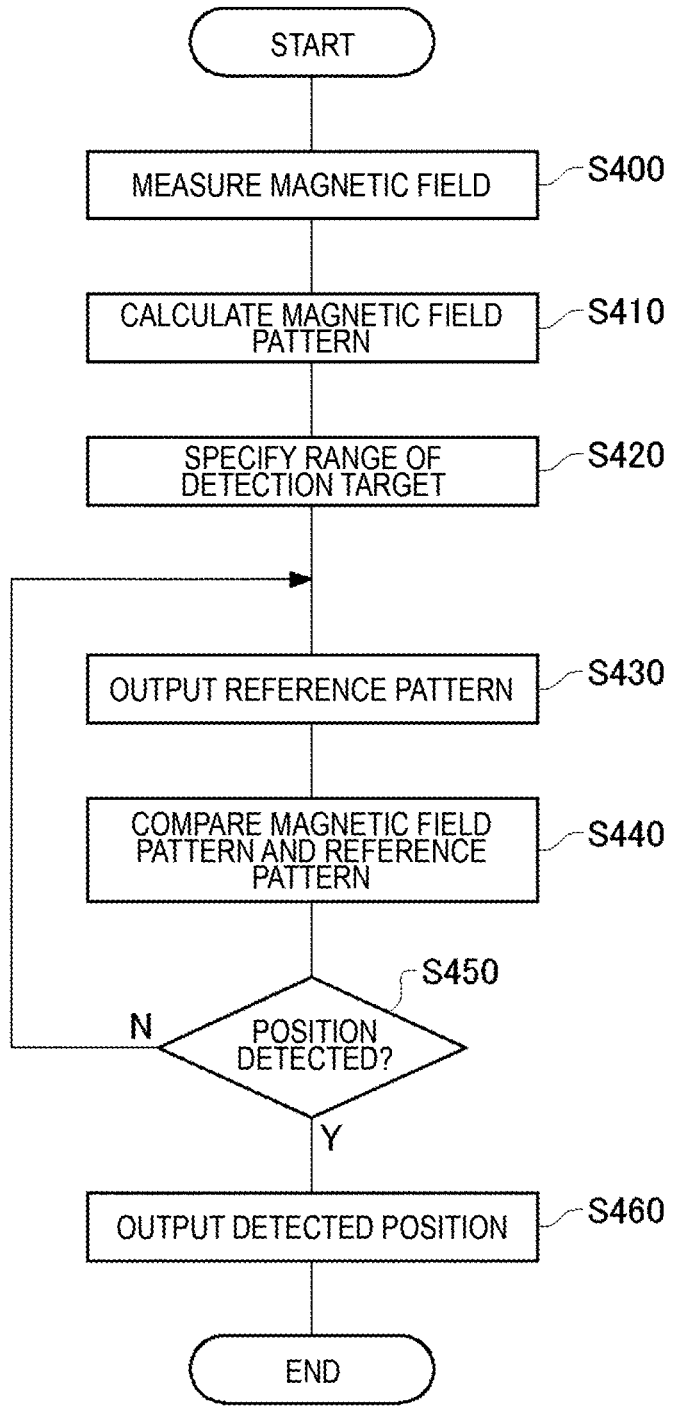
FIG. 4 illustrates a flow of position detection according to the present embodiment.

FIG. 4 illustrates a flow of position detection according to the present embodiment. At Step 400 (S400), each of the plurality of magnetic sensors 40 measures the magnetic field at the position at which each magnetic sensor 40 is provided and outputs the output value according to the magnetic field. Here, when the drive section 50 takes a configuration where it moves the moving target 70 by generating a magnetic force between the magnet 75 or other magnets and the driving coil, the drive control section 160 may stop generating the magnetic field by the driving coil during a period in which the magnetic field is measured. At Step S410, each of the plurality of calculation section 45 calculates the detected value corresponding to the magnetic sensor section 35 including that calculation section 45 in the magnetic field pattern based on each output value from at least one magnetic sensor 40 connected therewith.

At Step S420, the range specifying section 120 specifies the detection target range for the position of the moving unit 60 with respect to the detection unit 30 as a part of a movable range based on the magnetic field pattern measured by the plurality of magnetic sensor sections 35. The range specifying section 120 may state a range in which the reference pattern that is close to the acquired magnetic field pattern possibly exist as a detection target range and exclude a range in which the reference pattern close to the magnetic field pattern does not exist from the detection target range, based on a combination of plurality of detected values contained in the acquired magnetic field pattern. As an example, the range specifying section 120 specifies the detection target range as follows.

(1) Specifying the Detection Target Range According to the Magnitude Relationship of the Detected Values The range specifying section 120 may specify the detection target range based on the magnitude relationship of the respective detected values contained in the magnetic field pattern. For example, in the example in FIG. 3, four detected values in the acquired magnetic field pattern have the magnitude relationship of S1>S2>S4>S3, the range in which four detected values having such magnitude relationship can exist is limited to the position of the moving unit 60 within a range of approximately 2 to 2.5 mm. Thus, the range specifying section 120 may specify the detection target range to approximately 2 to 2.5 mm.

Note that the plurality of detected values to be detected actually by the plurality of magnetic sensor section 35 have some deviation as compared to theoretical values, causing some deviation as well in the position at which the magnitude relationship changes. Accordingly, instead of defining the detection target range to be the exact range the magnitude relationship matches defined by the theoretical values of the plurality of detected values, the range specifying section 120 may define the detection target range having some margin on both sides of the range. For example, when the range having the magnitude relationship that matches the acquired magnetic field pattern is 2 to 2.5 mm in theory, the range specifying section 120 sets the detection target range to be 1.8 to 2.7 mm provided with margins of e.g., 0.2 mm above and below the range.

Here, the range specifying section 120 may specify the detection target range using the magnitude relationship of all the detected values contained in the magnetic field pattern, or may specify the detection target range using only the magnitude relationship of some of the detected values. For example, the range specifying section 120 may specify the detection target range based on the magnitude relationship of only the detected values S1 and S2, thereby making the detection target range to 2 to 4 mm when S1>S2 or making the detection target range to 0 to 2 mm and 4 to 6 mm when S2>S1. Here, the range specifying section 120 may specify the detection target range using the magnitude relationship of different detected values for each range. For example, the range specifying section 120 may specify the detection target range using the magnitude relationship of the detected values S1 and S2 for the range of 0 to 6 mm or specify the detection target range using the magnitude relationship of the detected values S3 and S4 for the range of 6 to 12 mm.

Moreover, the range specifying section 120 may specify the detection target range based on which of the plurality of detected values being the largest, the smallest, what number from the largest, or the like. For example, the range specifying section 120 states approximately 2 to 3.5 mm and around 6.5 mm as the detection target range when the detected value S1 is the largest among the detected values S1 through S4 in FIG. 3.

(2) Specifying the Detection Target Range According to Positive and Negative Values of the Detected Values The range specifying section 120 may specify the detection target range using positive and negative values of one detected value or two or more detected values. For example, the range specifying section 120 may use a combination of positive and negative values of the detected values S2 and S3 to specify the detection target range to be 0.5 to 1.8 mm, 4.5 to 5.5 mm, and 8.2 to 9.5 mm, for example, when the detected values S2 and S3 are positive in FIG. 3.

(3) Specifying the Detection Target Range According to the Magnitude of the Detected Values The range specifying section 120 may use the magnitude of one detected value or two or more detected values to specify the detection target range. For example, the range specifying section 120 may use the magnitude of the detected value S1 to specify the detection target range to be 2 to 3 mm when the detected value S1 is within a range of 100 to 250 mT in FIG. 3.

At S430, the reference pattern output section 140 outputs the reference pattern corresponding to each of the one or more candidate positions within the detection target range specified by the range specifying section 120. In the flow of position detection in this drawing, the reference pattern output section 140 outputs one reference pattern every time S430 is performed corresponding to each candidate position into which the detection target range is divided by small intervals between the lower limit and the upper limit. Here, the reference pattern output section 140 may select the candidate position from the lower limit to the upper limit or from the upper limit to the lower limit of the detection target range in sequence every time S430 is performed and output the reference pattern corresponding to that candidate position. Moreover, when the detection target range includes a plurality of ranges separate from each other, the reference pattern output section 140 may select the candidate position in sequence from the lower limit to the upper limit, for example, for each of these plurality of ranges.

At S440, the detection section 150 compares the magnetic field pattern acquired by the acquisition section 110 and the reference pattern output from the reference pattern output section 140. At S450, the detection section 150 determines, based on the result of comparison of the magnetic field pattern and the reference pattern, whether the position of the moving unit 60 is detected. If the position of the moving unit 60 is not detected ("N" in S450), the detection section 150 proceeds the process to S430 and performs comparison using the reference pattern corresponding to the next position. If the position of the moving unit 60 is detected ("Y" in S450), the detection section 150 proceeds the process to S460 and outputs the detected position.

The detection section 150 according to the present embodiment detects which of the plurality of candidate position is the position of the moving unit 60 with respect to the detection unit 30 based on the result of comparison of the reference pattern, corresponding to each of the plurality of candidate positions output from the reference pattern output section 140 in the repetition of the process S430 through S450, and the magnetic field pattern. As an example, the detection section 150 determines the candidate position associated to the reference pattern closest to the magnetic field pattern among the reference patterns respectively corresponding to each of the plurality of candidate positions to be the position of the moving unit 60 with respect to the detection unit 30. In this case, the detection section 150 may compare the reference pattern corresponding to each candidate position and the magnetic field pattern, for all the candidate positions within the detection target range, to determine the candidate position after comparison is performed for all the candidate positions. At S460, the detection section 150 outputs the detected position of the moving unit 60.

Alternatively, the detection section 150 may determine the candidate position associated to the reference pattern, having a difference with the magnetic field pattern equal to or smaller than a predetermined reference difference, among the reference patterns respectively corresponding to each of the plurality of candidate positions, to be the position of the moving unit 60 with respect to the detection unit 30. In this case, the detection section 150 may change the candidate position within the detection target range continuously as comparing the reference pattern of that candidate position and the magnetic field pattern, and then find the reference pattern having a difference with the magnetic field pattern below the reference difference to determine corresponding thereto that the candidate position associated to that reference pattern is the position of the moving unit 60, thereby canceling the repetition of the process S430 through S450 and proceeding it to S460.

Note that, at S460, the detection section 150 may use, based on the position of the moving unit 60 detected from the result of comparison of the reference pattern and the magnetic field pattern, the detected value of the magnetic sensor section 35 associated to that position to determine the final position of the moving unit 60. For example, the detection section 150 may use the result of comparison of the reference pattern and the magnetic field pattern to determine which of the plurality of discrete candidate positions the moving unit 60 is close to, and use the magnitude of the detected value from the magnetic sensor section 35 which is close to the determined position to calculate using interpolation that where between the discrete candidate positions the moving unit 60 is.

In this case, the detection section 150 is enabled to detect the position of the moving unit 60 with higher accuracy. Moreover, the detection section 150 may compare the detected value of the magnetic sensor section 35, associated to the position detected from the result of comparison of the reference pattern and the magnetic field pattern, and their local approximate equation (the approximate equation with higher accuracy), or compare the magnetic field pattern measured by the plurality of magnetic sensor sections 35 and the reference pattern for each of more local small intervals. In this case, the reference data storing section 130 may further store such local approximate equations or more detailed reference patterns.

Moreover, in the case where the detection section 150 specifies the magnetic sensor section 35 associated to the position of the moving unit 60 from the result of comparison of the reference pattern and the magnetic field pattern, determines the position of the moving unit 60 using the detected value of the specified, e.g., one or two magnetic sensor sections 35, for example, the detection accuracy in the position of the moving unit 60 detectable from the result of comparison of the reference pattern and the magnetic field pattern may be such that, e.g., one or two magnetic sensor sections 35 associated to that position can be specified. In this case, the reference data storing section 130 may store, by corresponding to each magnetic sensor section 35, one reference pattern associated to a representative position within a position detection range by that magnetic sensor section 35, may store the reference pattern corresponding to each position on both ends within the detection range, or may store the reference pattern corresponding to each position on both ends and at least one intermediate point within the detection range.

According to such a detection section 150, as compared to the case where the final position of the moving unit 60 is determined by the result of comparison of the reference pattern and the magnetic field pattern, it can reduce the number of reference patterns to be compared to the magnetic field pattern, which allows reducing the number of repetitions of the process S430 through S450. Accordingly, the detection section 150 can reduce the processing time required for position detection of the moving unit 60.

Moreover, the detection section 150 may be switchable to output the position associated to the reference pattern or to output the final position determined using the detected value by the magnetic sensor section 35 associated to the position, as the position of the moving unit 60 with respect to the detection unit 30. For example, when relatively low accuracy of position detection is acceptable but the rapid position detection is required, the detection section 150 may be set to a position detection mode to output the position associated to the reference pattern according to an instruction from the outside. Moreover, when higher accuracy of position detection is required, the detection section 150 may set to a position detection mode to calculate the final position using the detected value by the magnetic sensor section 35 for the position associated to the reference pattern according to an instruction from the outside.

In the flow of position detection as illustrated above, the position detection apparatus 100 can produce the reference pattern corresponding to each of the plurality of candidate positions to compare it to the magnetic field pattern acquired from the detection unit 30, thereby specifying the candidate position that provides the reference pattern close to the magnetic field pattern. Whereby, if a theoretical value or target value for each detected value is known that is output by the plurality of magnetic sensor sections 35 for each position of the moving unit 60, the position detection apparatus 100 can use it to detect the position of the moving unit 60.

Note that the position detection apparatus 100 may not have the range specifying section 120, and the flow of position detection in FIG. 4 may not comprise S420. In this case, the reference pattern output section 140 may output the reference pattern corresponding to each of the plurality of candidate positions included in the entire movable range of the moving unit 60.

FIG. 5 illustrates exemplary reference data stored in the reference data storing section 130 according to the present embodiment. The reference data in this drawing stores, for each of a plurality of entries shown by indices, a set of a position x(i) of the moving unit 60 with respect to the detection unit 30 and a reference pattern (S(i)1, S(i)2, ..., S(i)N) corresponding to that position. Here, i denotes an index number, which is an integer of 1 to I. x(i) denotes a position associated to an i-th entry. (S(i)1, S(i)2, ..., S(i)N) denotes a reference pattern corresponding to the i-th entry.

At S430 in FIG. 4, the reference pattern output section 140 selects from among the reference data the position x(i) included in the detection target range measured by the range specifying section 120 as the candidate position, and outputs the candidate position x(i) and the reference pattern (S(i)1, S(i)2, S(i)N) corresponding to that position to the detection section 150. The detection section 150 detects the position of the moving unit 60 with respect to the detection unit 30 based on the result of comparison of the magnetic field pattern and the reference pattern.

As an example, x(i) may be a real number value that indicates each position in the movable range of the moving unit 60 divided by a minimum measurement unit such as 0.01 mm, for example, and each reference value of the reference pattern S(i)1, S(i)2, ..., S(i)k, ..., S(i)N denotes a detected value of magnetic field $Sk(x)$ that should be detected by each magnetic sensor section 35-$k$ ($k=1, ..., N$) when the moving unit 60 is located at the position x(i).

In another example, x(i) may denote each interval of the divided movable range of the moving unit 60, and S(i)1, S(i)2, ..., S(i)k, ..., S(i)N may be a parameter such as a coefficient of an approximation function for calculating the detected value of magnetic field that should be detected at the interval i. For example, the reference value $Sk(x)$ corresponding to the position x in each interval may be approximated with a linear expression such as the approximation function $Sk(x)=ak*x+bk$, and the reference data storing section 130 may store a parameter $ak, bk$ of the approximation function $Sk(x)$ while corresponding it to each interval. The approximation function $Sk(x)$ may be a higher-order expression as long as it is the function of the position x, or may be other forms of expression using a trigonometric function as an example.

When the approximation function is corresponded to each interval, the reference pattern output section 140 may calculate and output the reference pattern corresponding to each of the respective candidate positions using the approximation function for the interval corresponding to each candidate position. At this point, the reference pattern output section 140 may output the reference pattern first stating that the one candidate position or two or more candidate positions for each interval included in the detection target range as the representative candidate positions. In this case, the detection section 150 first detects which of the representative candidate positions is close to the position of the moving unit 60 based on the result of comparison of the reference pattern and the magnetic field pattern at the representative candidate position for each interval. Next, the reference pattern output section 140 generates one candidate position or two or more candidate positions in the interval including the detected representative candidate position, and the detection section 150 detects which of the candidate positions is the position of the moving unit 60 based on the result of comparison of the reference pattern and the magnetic field pattern corresponding to each candidate position.

By storing the reference pattern corresponding to each position within the movable range of the moving unit 60 with respect to the detection unit 30 in the reference data storing section 130, the reference data storing section 130 can store the reference patterns for any magnetic field patterns that can have different characteristics depending on the arrangement of each magnetic sensor 40, the shape of the magnet 75, and other conditions. Whereby, the reference pattern output section 140 can output the reference pattern for any position within the movable range of the moving unit 60. Moreover, when the reference data storing section 130 stores the approximation function associated to each interval into which the movable range of the moving unit 60 is divided, each interval can be extended and thus the size of the reference data can be reduced under the condition that an error between the original reference pattern and the reference pattern made from the approximation function is within an acceptable range.

Note that, at S430 in FIG. 4, the reference pattern output section 140 may smooth a predetermined number of reference patterns whose corresponding positions are adjacent to each other in the reference data to output them as the reference patterns used to detect the position of the moving unit 60 with respect to the detection unit 30. For example, the reference pattern output section 140 may output, as the reference pattern corresponding to the position x(i) excluding two points on both ends of the movable range, the reference pattern made by smoothing the respective reference patterns stored in the reference data storing section 130 with corresponding them to each of the positions x(i−2) to x(i+2), to the detection section 150. Such smoothing may be one using averaging, linear approximation, approximation with a quadratic function or higher-order function, or other approximation. Whereby, even when some of the reference patterns contain noise or data loss is caused due to temporal malfunctions or the like, the position detection apparatus 100 can suppress the reduction in accuracy of position detection. Here, the reference pattern output section 140 may change dynamically the number of adjacent reference patterns used for producing the reference pattern for each position.

Moreover, in the example in FIG. 5, the reference data storing section 130 stores the reference pattern in each entry used to compare to the magnetic field pattern output from the plurality of magnetic sensor sections 35. Alternatively, the reference data storing section 130 may store a set of output values to be output from the plurality of magnetic sensors 40 in each entry. In this case, the reference pattern output section 140 may calculate, for each candidate position, the difference between the output values corresponding to the adjacent magnetic sensors 40, for example, from a set of output values stored in the reference data storing section 130, to convert it to the reference pattern and output it.

Moreover, when the detected value of magnetic field in each magnetic sensor 40 can be defined in theory as the function for the position x of the moving unit 60 with respect to the detection unit 30, the reference pattern output section 140 can output the reference pattern corresponding to the candidate position using such a function without using the reference data stored in the reference data storing section 130. In this case, the position detection apparatus 100 may not have the reference data storing section 130. Further, when an inverse function of such a function can be defined, the detection section 150 may calculate the position of the moving unit 60 using such an inverse function from the magnetic field pattern acquired by the acquisition section 110.

Moreover, the position and the number N of sets of the reference patterns stored in the reference data storing section 130 may be determined based on the required accuracy of position detection, the required processing time of position detection, a data size capable of being stored in the reference data storing section 130, and the like. For example, N may be decreased when the required accuracy of position detection is lower, while N may be increased when the required accuracy of position detection is higher. Moreover, N may be decreased when the required processing time of position detection is shorter, while N may be increased when the processing time of position detection may be longer.

When the position detection apparatus 100 is used for application such as focus adjustment in the imaging apparatus, the position detection apparatus 100 is required to output the exact current position after the movement of the moving unit 60. In this case, the position detection apparatus 100 may store more sets of positions and reference patterns in the reference data storing section 130, thereby obtaining the higher accuracy of position detection. Moreover, as described with reference to FIG. 4, the position detection apparatus 100 may specify the magnetic sensor section 35 associated to the position of the moving unit 60 from the result of comparison of the reference pattern and the magnetic field pattern, and determine the position of the moving unit 60 using the detected value by the specified magnetic sensor section 35.

Moreover, for example, when the position detection apparatus 100 is used for application of detecting a variation in the position of the moving unit 60 due to e.g., an impact from the outside, the accuracy of position detection of the moving unit 60 may be relatively low. In this case, the position detection apparatus 100 may decrease the number of sets of positions and reference patterns stored in the reference data storing section 130. For example, the position detection apparatus 100 may reduce the accuracy of position detection to a degree of accuracy in which the magnetic sensor section 35 corresponding to the position of the moving unit 60 can specify, to shorten the processing time of position detection and repeat the position detection at shorter cycles. The position detection apparatus 100 may receive an instruction from the outside corresponding to the required accuracy of position detection and processing time of position detection, to switch the number of sets of the positions and the reference patterns used for the position detection of the moving unit 60.

Figure 6:
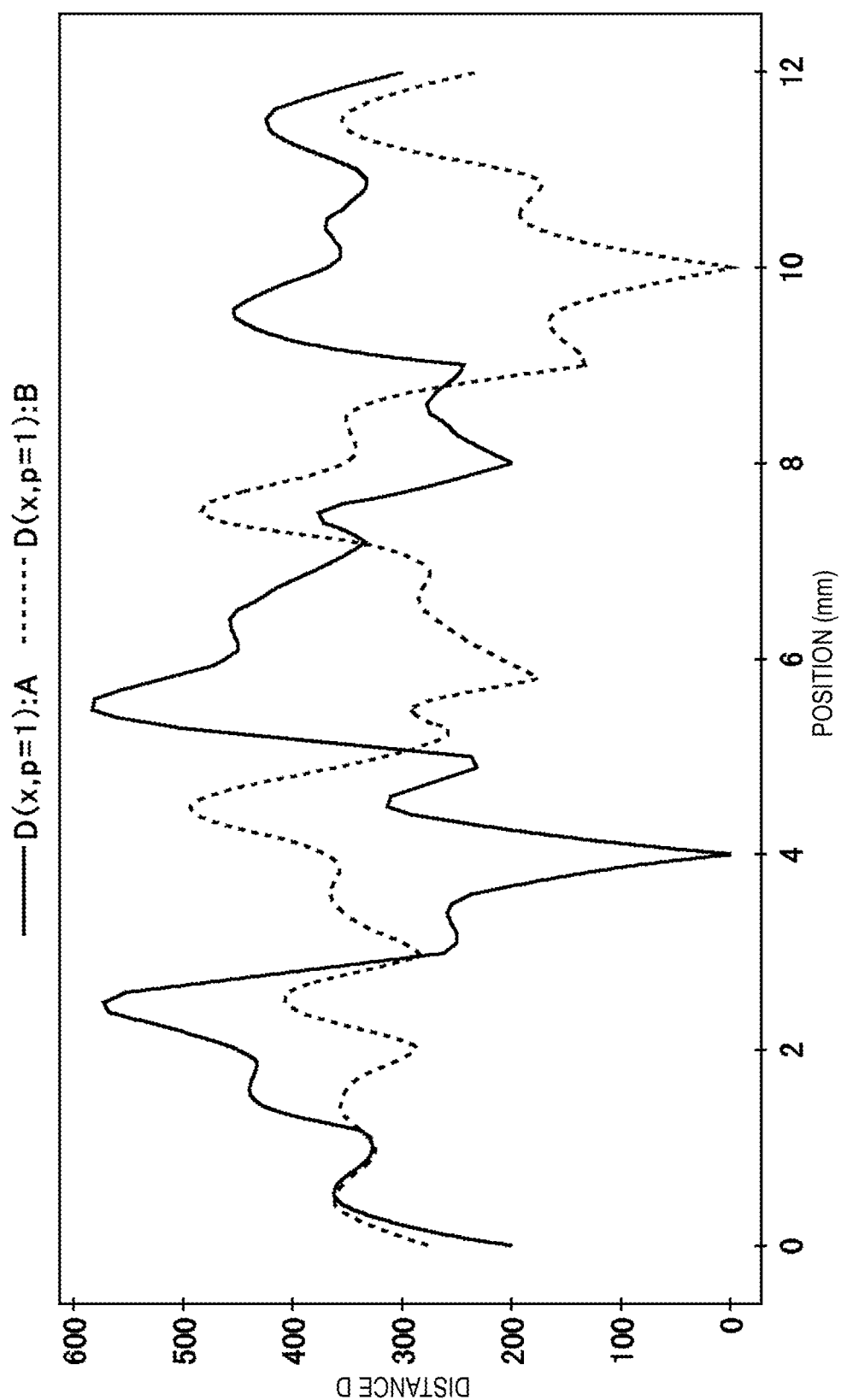
FIG. 6 illustrates an exemplary relationship between a position of the moving unit 60 with respect to the detection unit 30 and a distance between an acquired magnetic field pattern and a reference pattern.

FIG. 6 illustrates an exemplary relationship between the position of the moving unit 60 with respect to the detection unit 30 and the distance between the acquired magnetic field pattern and the reference pattern. The detection section 150 may use the distance between the magnetic field pattern and the reference pattern as a measure that represents closeness or a magnitude of difference of the magnetic field pattern and the reference pattern. In the example of this drawing, the Minkowski distance is used as this distance. When the number of dimensions is p, the Minkowski distance D(x, p) of the magnetic field pattern sj and the reference pattern S(x)j is represented in the equation below. Here, j denotes a number of the magnetic sensor section 35.

$$D(x, p) = \left( \sum^{j} |S(x)_j - s_j|^p \right)^{1/p} \quad \text{[Expression 1]}$$

Note that, when p=1, the Minkowski distance D(x, 1) would be the Manhattan distance. Moreover, when p=2, the Minkowski distance D(x, 2) would be the Euclidean distance. The detection section 150 may use, as a measure that represents the closeness or the magnitude of difference of the magnetic field pattern and the reference pattern, these Minkowski distances as above, may use other distances, or may use other measures such as a similarity. When the distance is used, the smaller the distance between magnetic field pattern and the reference pattern is, the closer the magnetic field pattern and the reference pattern are (the smaller the difference is), while the larger the distance between magnetic field pattern and the reference pattern is, the farther the magnetic field pattern and the reference pattern are (the larger the difference is).

This drawing shows that, in the example in FIG. 3, when the position of the moving unit 60 with respect to the detection unit 30 is at the position A which is 4 mm from the end point of the movable range and when it is at the position B which is 10 mm from the end point of the movable range, the distance between the reference pattern and the magnetic field pattern corresponding to each candidate position in the abscissa direction. For example, when the moving unit 60 is at the position A, the distance between the reference pattern and the magnetic field pattern corresponding to each candidate position in the movable range of 0 through 12 mm changes as the candidate position shifts from 0 to 12 mm, as shown by the solid line in the drawing. Here, this distance becomes minimum, approximately 0, when the candidate position comes to 4 mm which is as same as the position A. Accordingly, the position detection apparatus 100 can produce the candidate positions in the movable range of 0 through 12 mm at a 0.01 mm pitch, for example, and compare the reference pattern corresponding to each candidate position and the magnetic field pattern to detect the candidate position corresponding to the reference pattern having a distance smallest or within a predetermined margin range (e.g., 10 or less in this drawing), thereby detecting that the position of the moving unit 60 is at the 4 mm position.

Similarly, when the moving unit 60 is at the position B, the distance between the reference pattern and the magnetic field pattern corresponding to each candidate position in the movable range of 0 through 12 mm becomes minimum, approximately 0, when the candidate position comes to 10 mm which is as same as the position B. Accordingly, in similar manner as above, the position detection apparatus 100 can detect the candidate position corresponding to the reference pattern having a distance smallest or within a predetermined margin range, thereby detecting that the position of the moving unit 60 is at the 10 mm position.

Figure 7:
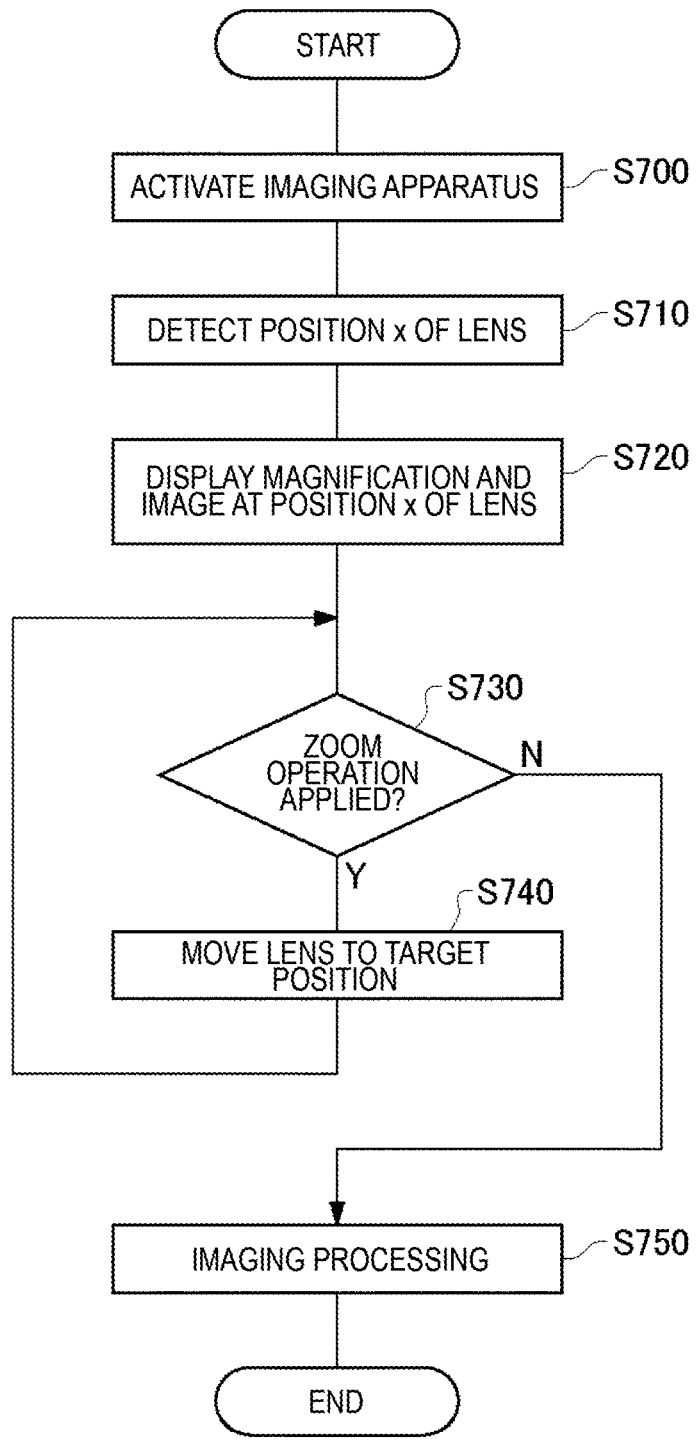
FIG. 7 illustrates a flow of imaging processing of an imaging apparatus according to an example of the present embodiment.

FIG. 7 illustrates a flow of imaging processing of an imaging apparatus according to an example of the present embodiment. This drawing shows the processing when the system 10 is the imaging apparatus that has an optical system including a lens serving as the moving target 70 and moves the lens for zooming. Before entering the flow of imaging processing in this drawing, the system 10 is, e.g., in a power-off or sleep state, and the moving unit 60 is movable freely with respect to the detection unit 30. Therefore, before entering the flow of imaging processing in this drawing, the position of the moving unit 60 with respect to the detection unit 30 is unknown.

At S700, the system 10 serving as the imaging apparatus is activated. At S710, the position detection apparatus 100 in the system 10 detects the position x of the lens with respect to the housing 32 by the processing of position detection as shown in FIG. 4, as an example. At this point, the position detection apparatus 100 can apply the absolute position detection to detect the position x of the lens without once moving the lens to a predetermined reference position.

At S720, the system 10 displays a zoom magnification when the lens is at the position x and an image of a subject on a display device such as a display panel. At S730, the system 10 determines whether a zoom operation is applied. Here, the "zoom operation" is an operation to zoom in (increase the focal length of the optical system) or zoom out (decrease the focal length of the optical system) the subject.

When the zoom operation is applied, at S740, a controller in the system 10 supplies the target position of the moving unit 60 for setting the focal length of the optical system to the focal length designated by the zoom operation to the drive control section 160. The drive control section 160 controls the drive section 50 so as to move the position of the moving unit 60 closer to the target position, thereby moving the moving unit 60 to the target position. The system 10 may continue moving the position of the moving unit 60 to the target position while the zoom operation is applied.

When the zoom operation is no longer applied, at S750, the system 10 performs the imaging processing. For example, the system 10 may capture an image formed on an imaging element by the optical system. According to the flow of imaging processing as shown above, the system 10 can detect the position x of the lens by the absolute position detection, eliminating the need to once move the lens to the reference position of the relative position detection even immediately after activation.

The flow of imaging processing as shown above illustrates the example in which the system 10 serving as the imaging apparatus performs the position detection and driving of the zooming lens serving as the moving target 70. Alternatively, the system 10 may perform the position detection and driving of a focusing lens serving as the moving target 70, or may perform the position detection and driving of a blurring correction lens serving as the moving target 70 for restraining blurring of the image due to vibration of the imaging apparatus.

Moreover, the system 10 may detect whether the moving target 70 can be maintained in the target position after moving the moving target 70 to the target position, i.e., whether the moving target 70 has moved away from the target position. In order to implement this, the detection section 150 detects, after detecting that the position of the moving unit 60 with respect to the detection unit 30 is the target position, whether the moving unit 60 has moved away from the target position based on the result of comparison of the reference pattern associated to the target position and the magnetic field pattern that is acquired sequentially. For example, the position detection apparatus 100 may compare the magnetic field pattern that is acquired periodically and only one or some of the reference patterns associated to the target position, to determine that the moving unit 60 has moved away from the target position when the difference between the magnetic field pattern and the reference pattern exceeds the predetermined reference difference.

When the system 10 is the imaging apparatus, the system 10 moves the moving target 70 such as the lens to the target position at S730 and S740, and then detects whether the moving target 70 has moved away from the target position due to disturbance or the like at S750. When the moving target 70 has moved away from the target position during the imaging processing, the system 10 may detect the abnormality and proceeds the process to S710 to detect the position of the moving target 70 again, and perform the process of S720 through S740 again.

Figure 8:
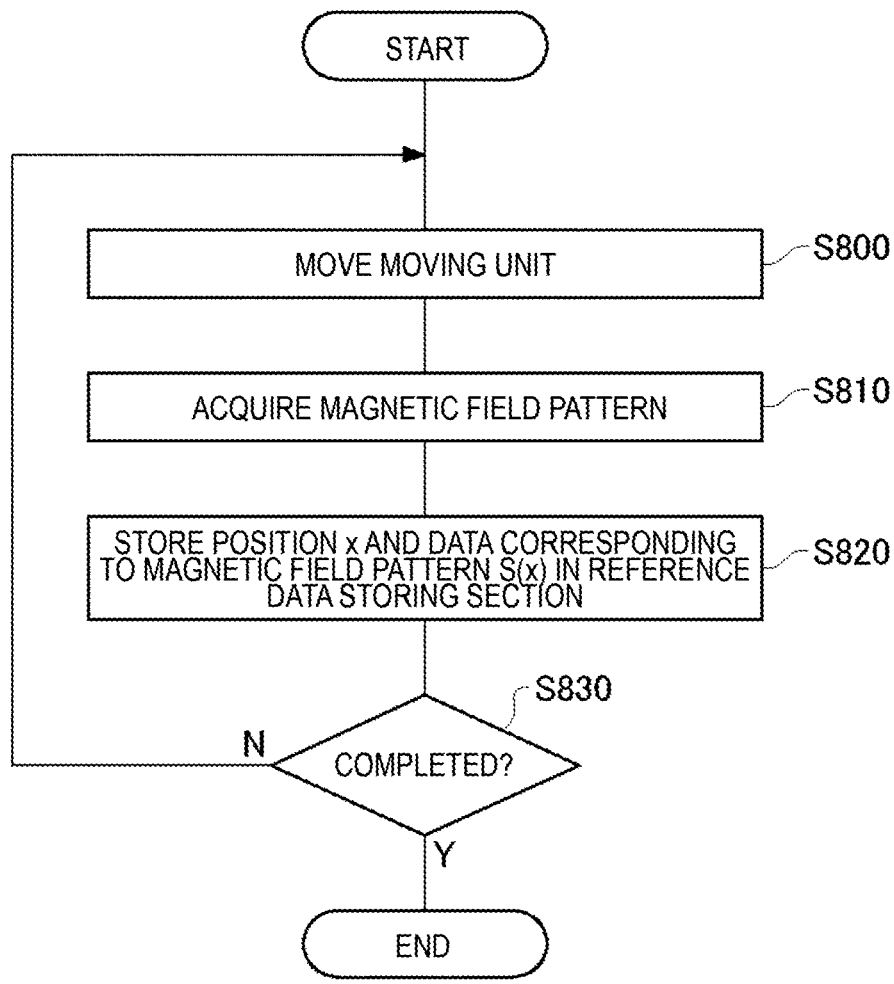
FIG. 8 illustrates a flow of preparing the reference data according to the present embodiment.

FIG. 8 illustrates a flow of preparing the reference data according to the present embodiment. In the flow of preparing in this drawing, the system 10 measures the magnetic field pattern output from the plurality of magnetic sensor sections 35 while moving the moving unit 60, and stores the measured magnetic field pattern in the reference data storing section 130 as the reference pattern. The system 10 may perform this flow of preparing for initial adjustment prior to shipment from the factory, or may perform this flow of preparing according to the instruction of adjustment of the system 10 after shipment from the factory.

At S800, the drive control section 160 moves the moving unit 60 to the position x that should serve as the candidate position. Here, in this flow of preparing, since the processing is for the detection section 150 to prepare the reference data used for position detection, the system 10 cannot perform position detection of the moving unit 60 using the reference data. Thus, the system 10 moves the moving unit 60 to the end point of the movable range when S800 is performed for the first time. Then, the system 10 may perform the control to drive the drive section 50 by a predetermined amount every time S800 is performed, thereby moving the moving unit 60 by a predetermined pitch. Moreover, prior to shipment from the factory, the position of the moving unit 60 with respect to the detection unit 30 may be measured by other measuring apparatuses not included in the system 10, and the detection section 150 may move the moving unit 60 to the candidate position using a measurement result by the other measuring apparatuses.

At S810, the acquisition section 110 acquires the magnetic field pattern S(x) output from the plurality of magnetic sensor sections 35 while the moving unit 60 is at the position x. At S820, the acquisition section 110 converts the magnetic field pattern S(x) into entry data corresponding to the position x in the reference data to store it in the reference data storing section 130. When the reference data stores the reference pattern itself, the acquisition section 110 corresponds the magnetic field pattern S(x) to the position x as the reference pattern to store it in the reference data storing section 130. When the reference data stores the approximation function of each detected value of magnetic field S(x)j in each interval, the acquisition section 110 calculate the approximation function of each detected value of magnetic field S(x)j from each detected value of magnetic field S(x)j contained in the magnetic field pattern S(x) to store the parameter of that approximation function in the reference data storing section 130.

At S830, when preparing of the reference data is completed for all the positions within the movable range, the system 10 terminates this flow of preparing. When the position remains for which preparing the reference data is not completed, the system 10 proceeds the process to S800 and performs the adjustment in the next position.

Using the flow of preparing in this drawing, the system 10 can produce the reference pattern using the magnetic field pattern observed actually in each position. Whereby, the system 10 can eliminate the effect due to the difference in the magnetic field pattern specific to the individual detection target apparatus 20 to reduce errors in the position detection.

Note that, in preparing processing of the reference data, the acquisition section 110 may acquire the magnetic field pattern at each position of the moving unit 60 with respect to the detection unit 30 as the reference pattern and smooth the predetermined number of adjacent reference patterns for each position to store them in the reference data storing section 130. For example, for each position x(i) excluding two points on both ends of the movable range, the acquisition section 110 may store the reference pattern made by smoothing five reference patterns acquired for five adjacent positions x(i−2) through x(i+2) in the reference data storing section 130. Whereby, at S810, even when the reference patterns to be acquired contain noise or data loss is caused in the reference pattern at some positions due to temporal malfunctions or the like, errors in the reference pattern stored in the reference data storing section 130 can be reduced. The acquisition section 110 may change dynamically the number of adjacent reference patterns used for producing the reference pattern for each position.

Note that FIG. 1 through FIG. 8 illustrate the case where the movement of the moving unit 60 with respect to the detection unit 30 is one-dimensional direction. Alternatively, the detection target apparatus 20 may move the moving unit 60 with respect to the detection unit 30 multi-dimensionally (two-dimensionally, three-dimensionally). In this case, the detection target apparatus 20 may have a set of the detection unit 30 and the moving unit 60 that are movable relatively in the x-axis direction, for example, and the moving target 70 provided in the moving unit 60 may include a set of the detection unit and the moving unit that are movable relatively in the y-axis direction.

Alternatively, the detection unit 30 may have the plurality of magnetic sensor sections 35 arranged at two-dimensionally or three-dimensionally different positions with each other, and the moving unit 60 may have the magnet 75 that provides the different magnetic field patterns to the plurality of magnetic sensor sections 35 at each position within the two-dimensional or three-dimensional movable range. For example, the magnet 75 may include a magnet having S pole and N pole arranged alternately in the x-axis direction and a magnet having S pole and N pole arranged alternately in the y-axis direction. The reference pattern output section 140 outputs the reference pattern corresponding to each of the plurality of two-dimensional or three-dimensional candidate positions, and the detection section 150 may detect the candidate position associated to the reference pattern or the like closest to the magnetic field pattern acquired by the acquisition section 110, for example, among the reference patterns corresponding to each of the plurality of candidate positions, as the position of the moving unit 60.

Various embodiments of the present invention may be described with reference to the flowchart and block diagrams, wherein the blocks may represent: (1) steps of a process for performing operations; or (2) sections of an apparatus having functions to perform operations. A specific step or section may be implemented by a dedicated circuit, a programmable circuit provided along with computer-readable instructions stored on a computer-readable medium, and/or a processor provided with computer-readable instructions stored on a computer-readable medium. The dedicated circuit may include a digital and/or analog hardware circuit, and may include an integrated circuit (IC) and/or a discrete circuit. The programmable circuit may include a reconfigurable hardware circuit, including logic operations such as logic AND, logic OR, logic XOR, logic NAND, logic NOR, and the like, as well as memory elements such as a flip-flop, a register, a field programmable gate array (FPGA), and a programmable logic array (PLA).

The computer-readable medium may include any tangible device that can store instructions to be performed by a suitable device, so that the computer-readable medium having instructions stored therein comprises a product containing instructions that can be executed to configure means for performing operations specified in the flowchart or block diagrams. Examples of the computer-readable medium may include an electronic storage medium, a magnetic storage medium, an optical storage medium, a magneto-electric storage medium, a semiconductor storage medium, and the like. More specific examples of the computer-readable medium may include a floppy (registered trademark) disk, a diskette, a hard disk, a random access memory (RAM), a read-only memory (ROM), an erasable programmable read-only memory (EPROM or flash memory), an electrically-erasable programmable read-only memory (EEPROM), a static random access memory (SRAM), a compact disc read-only memory (CD-ROM), a digital versatile disk (DVD), a Blu-ray (registered trademark) disk, a memory stick, an integrated circuit card, and the like.

The computer-readable instructions may include assembler instructions, instruction set architecture (ISA) instructions, machine instructions, machine-dependent instructions, microcodes, firmware instructions, state setting data, or any of source codes or object codes described in any combination of one or more programming languages, including object-oriented programming languages, such as Smalltalk (registered trademark), JAVA (registered trademark), or C++, and conventional procedural programming languages, such as "C" programming languages or similar programming languages.

The computer-readable instructions may be provided to processors or programmable circuits of programmable data processing apparatuses such as general-purpose computers, special-purpose computers, or other computers, locally or via local area network (LAN) or wide area network (WAN) such as the Internet, wherein the computer-readable instructions are executed to configure means for performing the operations specified in the flowchart or block diagrams. Examples of the processors include a computer processor, a processing unit, a microprocessor, a digital signal processor, a controller, a microcontroller, and the like.

Figure 9:
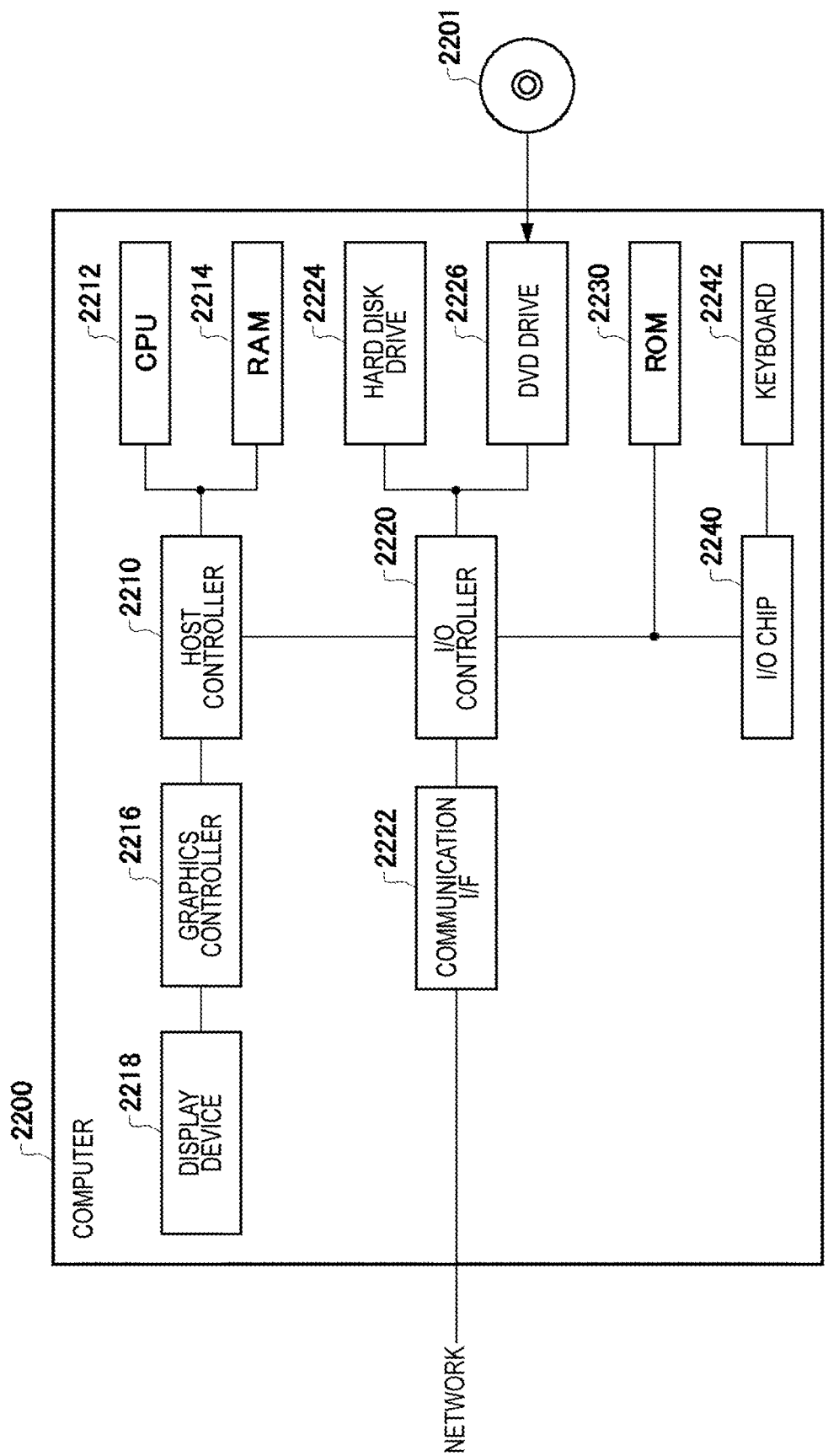
FIG. 9 illustrates an exemplary computer 2200 in which several aspects of the present invention may be wholly or partially embodied.

FIG. 9 illustrates an exemplary computer 2200 in which several aspects of the present invention may be wholly or partially embodied. A program installed in the computer 2200 can cause the computer 2200 to function as operations associated with the apparatus according to the embodiments of the present invention or one or more sections of the apparatus, or can cause it to perform the operations or the one or more sections, and/or can cause the computer 2200 to perform a process or steps of the process according to the embodiments of the present invention. Such a program may be executed by a CPU 2212 to cause the computer 2200 to perform specific operations associated with some or all of the blocks in the flowchart and block diagrams described in the specification.

The computer 2200 according to the present embodiment includes the CPU 2212, a RAM 2214, a graphics controller 2216, and a display device 2218, which are connected to each other via a host controller 2210. The computer 2200 also includes a communication interface 2222, a hard disk drive 2224, a DVD-ROM drive 2226, and an I/O unit such as an IC card drive, which are connected to the host controller 2210 via an I/O controller 2220. The computer further includes a legacy I/O unit such as a ROM 2230 and a keyboard 2242, which are connected to the I/O controller 2220 via an I/O chip 2240.

The CPU 2212 operates in accordance with a program stored in the ROM 2230 and the RAM 2214, thereby controlling each unit. The graphics controller 2216 obtains image data generated by the CPU 2212 in a frame buffer or the like provided in the RAM 2214 or in itself, so that the image data is displayed on the display device 2218.

The communication interface 2222 communicates with other electronic devices via a network. The hard disk drive 2224 stores a program and data used by the CPU 2212 in the computer 2200. The DVD-ROM drive 2226 reads a program or data from a DVD-ROM 2201, and provides the program or data to the hard disk drive 2224 via the RAM 2214. The IC card drive reads a program or data from an IC card, and/or write a program or data in the IC card.

The ROM 2230 stores a boot program or the like executed by the computer 2200 upon activation, and/or a program dependent on hardware of the computer 2200. The I/O chip 2240 may also connect various I/O units to the I/O controller 2220 via a parallel port, a serial port, a keyboard port, a mouse port, or the like.

A program is provided to a computer-readable medium such as the DVD-ROM 2201 or IC card. The program is read from the computer-readable medium, installed in the hard disk drive 2224, the RAM 2214, or the ROM 2230 serving also as an example of the computer-readable medium, and executed by the CPU 2212. Such a program describes information processing, which is read by the computer 2200 to link the program with the various types of hardware resources as mentioned above. The apparatus or method may be configured by implementing information operation or processing using the computer 2200.

For example, upon communication between the computer 2200 and an external device, the CPU 2212 may execute a communication program loaded in the RAM 2214 and, based on the processing described in the communication program, instruct the communication interface 2222 to perform communication processing. The communication interface 2222, under control of the CPU 2212, reads transmission data stored in a transmission buffer processing area provided in a recording medium such as the RAM 2214, the hard disk drive 2224, the DVD-ROM 2201, or the IC card, and transmits the read transmission data to a network, or otherwise writes received data from the network in a reception buffer processing area or the like provided in the recording medium.

Also, the CPU 2212 may allow the RAM 2214 to read all or necessary parts of a file or database stored in an external recording medium, such as the hard disk drive 2224, the DVD-ROM drive 2226 (DVD-ROM 2201), and the IC card, to perform various types of processing for the data stored on the RAM 2214. The CPU 2212 then writes back the processed data in the external recording medium.

Various types of information such as various types of programs, data, tables, and databases may be stored in the recording medium for information processing. On the data read from the RAM 2214, the CPU 2212 may perform various types of processing including various types of operations, information processing, condition determination, conditional branching, unconditional branching, information retrieval/conversion, and the like, which are described anywhere in the present disclosure and specified by an instruction sequence of a program, and write back the result in the RAM 2214. The CPU 2212 may also retrieve information in a file or database, for example, in the recording medium. For example, when the recording medium stores a plurality of entries each having a first attribute value associated with a second attribute value, the CPU 2212 may retrieve an entry from the plurality of entries that satisfies a condition where the first attribute value is satisfied, read out the second attribute value stored in the entry, thereby obtaining the second attribute value associated with the first attribute value that satisfies a predetermined condition.

The programs or software modules described above may be stored on the computer 2200 or a computer-readable medium in the vicinity of the computer 2200. Also, a recording medium such as a hard disk or RAM provided in a server system connected to a dedicated communication network or the Internet is usable as a computer-readable medium, thereby providing a program to the computer 2200 via the network.

While the embodiments of the present invention have been described, the technical scope of the present invention is not limited to the scope described in the above embodiments. It is apparent to persons skilled in the art that various alterations or improvements can be added to the above-described embodiments. It is also apparent from the description of the claims that the embodiments added with such alterations or improvements can be included in the technical scope of the present invention.

The operations, procedures, steps, stages, and the like of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: system; 20: detection target apparatus; 30: detection unit; 32: housing; 35-1 through 35-4: magnetic sensor section; 40-1a through 40-1b: magnetic sensor; 40-2a through 40-2b: magnetic sensor; 40-3a through 40-3b: magnetic sensor; 40-4a through 40-4b: magnetic sensor; 45-1 through 45-4: calculation section; 50: drive section; 60: moving unit; 70: moving target; 75: magnet; 100: position detection apparatus; 110: acquisition section; 120: range specifying section; 130: reference data storing section; 140: reference pattern output section; 150: detection section; 160: drive control section; 2200: computer; 2201: DVD-ROM; 2210: host controller; 2212: CPU; 2214: RAM; 2216: graphics controller; 2218: display device; 2220: I/O controller; 2222: communication interface; 2224: hard disk drive; 2226: DVD-ROM drive; 2230: ROM; 2240: I/O chip; 2242: keyboard

What is claimed is:

1. A position detection apparatus comprising:
an acquisition section configured to acquire, from a detection target apparatus comprising a detection unit having a plurality of magnetic sensor sections arranged at different positions from each other in a predetermined direction and a moving unit that is movable in the predetermined direction relative to the detection unit and configured to provide a magnetic field pattern depending on a position with respect to the detection unit to the plurality of magnetic sensor sections, the magnetic field pattern measured by the plurality of magnetic sensor sections;
a reference pattern output section configured to output reference patterns respectively corresponding to each of a plurality of candidate positions of the moving unit with respect to the detection unit;
a detection section configured to detect which of the plurality of candidate positions is a position of the moving unit with respect to the detection unit based on a result of comparison of the acquired magnetic field pattern and a reference pattern corresponding to each of the plurality of candidate positions among the reference patterns; and
a range specifying section configured to specify, based on the magnetic field pattern measured by the plurality of magnetic sensor sections, a detection target range for a position of the moving unit with respect to the detection unit as a part of a movable range, wherein
the detection section is configured to detect, based on a result of comparison of the magnetic field pattern and the reference pattern corresponding to a position within the detection target range, which position within the detection target range is a position of the moving unit with respect to the detection unit.

2. The position detection apparatus according to claim 1, wherein:
the plurality of magnetic sensor sections each has:
two or more magnetic sensors; and
a calculation section configured to calculate a detected value corresponding to the magnetic sensor section in the magnetic field pattern based on each output value from the two or more magnetic sensors.

3. The position detection apparatus according to claim 2, wherein the calculation section is configured to calculate, as the detected value, a difference between output values from magnetic sensors included in the two or more magnetic sensors.

4. The position detection apparatus according to claim 3, wherein a distance between the two or more magnetic sensors in each of the plurality of magnetic sensor sections is smaller than a distance between adjacent magnetic sensor sections among the plurality of magnetic sensor sections.

5. The position detection apparatus according to claim 2, wherein a distance between the two or more magnetic sensors in each of the plurality of magnetic sensor sections is smaller than a distance between adjacent magnetic sensor sections among the plurality of magnetic sensor sections.

6. The position detection apparatus according to claim 2, wherein the detection section is configured to determine a candidate position associated to a reference pattern closest to the magnetic field pattern among the reference patterns respectively corresponding to each of the plurality of candidate positions, to be a position of the moving unit with respect to the detection unit.

7. The position detection apparatus according to claim 1, wherein the detection section is configured to determine a candidate position associated to a reference pattern closest to the magnetic field pattern among the reference patterns respectively corresponding to each of the plurality of candidate positions, to be a position of the moving unit with respect to the detection unit.

8. The position detection apparatus according to claim 1, wherein the detection section is configured to determine a candidate position associated to a reference pattern, having a difference from the magnetic field pattern equal to or smaller than a predetermined reference difference, among the reference patterns respectively corresponding to each of the plurality of candidate positions, to be a position of the moving unit with respect to the detection unit.

9. The position detection apparatus according to claim 1, wherein the range specifying section is configured to specify the detection target range based on magnitude relationship of respective detected values contained in the magnetic field pattern.

10. The position detection apparatus according to claim 1, wherein the detection section is configured to determine, according to a position of the moving unit with respect to the detection unit being detected to be a position associated to the reference pattern, a final position of the moving unit with respect to the detection unit using a detected value of the magnetic sensor section associated to the position.

11. The position detection apparatus according to claim 10, wherein the detection section is switchable to output a position associated to the reference pattern or to output the final position as a position of the moving unit with respect to the detection unit.

12. The position detection apparatus according to claim 1, wherein the detection section is configured to detect, after detecting that a position of the moving unit with respect to the detection unit is a target position, whether the moving unit has moved away from the target position based on a result of comparison of a reference pattern associated to the target position and the magnetic field pattern.

13. The position detection apparatus according to claim 1, further comprising a reference data storing section configured to store reference data containing a plurality of sets of positions of the moving unit with respect to the detection unit and the reference patterns corresponding to the positions.

14. The position detection apparatus according to claim 13, wherein the reference pattern output section is configured to smooth a predetermined number of reference patterns whose corresponding positions are adjacent to each other in the reference data, and output them as the reference patterns used to detect a position of the moving unit with respect to the detection unit.

15. The position detection apparatus according to claim 13, wherein:
in preparing processing of the reference data, the acquisition section is configured to:
acquire the magnetic field pattern at each position of the moving unit with respect to the detection unit as the reference pattern; and
for each position, smooth a predetermined number of the reference patterns, which are adjacent to each other, to store them in the reference data storing section.

16. The position detection apparatus according to claim 1, wherein:
one of the detection unit and the moving unit is secured to a lens;
another of the detection unit and the moving unit is secured to a housing; and the detection section is configured to detect a position of the lens with respect to the housing.

17. A position detection system comprising the detection target apparatus and the position detection apparatus according to claim 1.

18. A position detection method comprising:
acquiring, from a detection target apparatus comprising a detection unit having a plurality of magnetic sensor sections arranged at different positions from each other in a predetermined direction and a moving unit that is movable in the predetermined direction relative to the detection unit and configured to provide a magnetic field pattern corresponding to a position with respect to the detection unit to the plurality of magnetic sensor sections, the magnetic field pattern measured by the plurality of magnetic sensor sections;

outputting reference patterns respectively corresponding to each of a plurality of candidate positions of the moving unit with respect to the detection unit;

detecting which of the plurality of candidate positions is a position of the moving unit with respect to the detection unit based on a result of comparison of the acquired magnetic field pattern and a reference pattern corresponding to each of the plurality of candidate positions among the reference patterns;

specifying, based on the magnetic field pattern measured by the plurality of magnetic sensor sections, a detection target range for a position of the moving unit with respect to the detection unit as a part of a movable range; and detecting, based on a result of comparison of the magnetic field pattern and the reference pattern corresponding to a position within the detection target range, which position within the detection target range is a position of the moving unit with respect to the detection unit.

* * * * *